United States Patent [19]

Rohr

[11] 4,038,462
[45] July 26, 1977

[54] SOLID-ELECTROLYTE BATTERY, PARTICULARLY FOR THE STORAGE OF ELECTRICAL ENERGY

[75] Inventor: Franz-Josef Rohr, Abtsteinach, Germany

[73] Assignee: BBC Brown Boveri & Company Limited, Mannheim, Germany

[21] Appl. No.: 671,335

[22] Filed: Mar. 29, 1976

[30] Foreign Application Priority Data

Mar. 27, 1975 Germany .............................. 2513649

[51] Int. Cl.² ........................................... H01M 6/18
[52] U.S. Cl. ..................................... 429/30; 429/104; 429/163
[58] Field of Search ............. 136/6 FS, 6 F, 20, 83 R, 136/83 T, 100 R; 429/30, 104, 163

[56] References Cited

U.S. PATENT DOCUMENTS

| | | | |
|---|---|---|---|
| 3,679,480 | 7/1972 | Brown et al. | 136/6 FS |
| 3,749,603 | 7/1973 | Stringham et al. | 136/6 F |
| 3,758,337 | 9/1973 | Fally et al. | 136/6 FS |
| 3,953,227 | 4/1976 | Jones | 136/6 FS |

*Primary Examiner*—Anthony Skapars
*Attorney, Agent, or Firm*—Oblon, Fisher, Spivak, McClelland & Maier

[57] ABSTRACT

Solid-electrolyte battery, particularly for the storage of electrical energy, with at least one anode space and one cathode space forming electrode spaces, which are connected with one another by ionic conduction through a solid electrolyte and which have collecting and equalizing spaces for the reactants and reaction products, wherein the solid-electrolyte battery includes a number of parallel-connected, hole-like electrode spaces including anode and cathode spaces, which are bounded by the solid electrolyte and distributed alternately and close together, so that each of the electrode spaces presents reaction surfaces simultaneously to at least two neighboring electrode spaces of the opposite polarity.

8 Claims, 14 Drawing Figures

SOLID-ELECTROLYTE BATTERY, PARTICULARLY FOR THE STORAGE OF ELECTRICAL ENERGY

BACKGROUND OF THE INVENTION

1. Field of the Invention

The invention concerns a solid-electrolyte battery, particularly for the storage of electrical energy, with at least one anode- and one cathode space (electrode spaces), which are connected to one another by ionic conduction through the solid electrolyte and which have collecting and equalizing spaces for the reactants and reaction products respectively.

In order for these batteries to be usable in as many fields of technology as possible, they should exhibit the following characteristics:

First, these batteries must possess a high energy density, i.e. their energy content must be as large as possible with the smallest size and/or weight. Further, the batteries must have a high specific output, they must be able to give high output with the smallest weight and/or volume. Long life is also desirable, i.e. the useful operating lifetime and the number of charge and discharge processes possible (cycling life) must be large. Finally, the materials necessary for making the batteries should be available in sufficient quantity for economical fabrication.

The endurance tests carried out thus far on storage cells or batteries have shown that the mentioned requirements of high specific output and long life or cycling life can not be simultaneously satisfied with the conventional battery construction. Thus it is possible to raise the specific output capacity of such batteries with large charge and discharge current densities, but this simultaneously reduces the lifetime. This is because high current loads and/or current density variations in the solid electrolyte alter its structure and often cause fissures which lead to internal short circuits. If on the other hand the charge and discharge current densities are made smaller, then the solid electrolyte is less loaded and the battery life is extended. Simultaneously, however, its weight and/or size increases so that the specific output is lessened.

The lifetime of such a battery can also be increased by reduction of the operation temperature. This again, however, has the disadvantage that the ionic conductivity of the solid electrolyte decreases and thereby reduces the specific output of the battery or the size of the battery must be increased for the same output.

Added to this is the fact that, in spite of numerous attempts, there has so far been little success in finding suitable materials for the battery case and metal parts incorporated in it which can withstand the reactants and can be made cheaply in sufficient quantity.

2. Description of the Prior Art

A known fuel cell (U.S. Pat. No. 3,300,344), constructed like a solid-electrolyte battery, needs for its fabrication a great number of component parts so that it is large in volume. The specific output is thus correspondingly low.

The sodium-sulfur battery disclosed in German Pat. No. 2,216,336 does indeed exhibit certain improvements in construction, but the main problem of higher energy density paired with higher specific output and long life is not solved.

SUMMARY OF THE INVENTION

The invention, then, addresses the problem of developing a solid-electrolyte battery of the aforementioned type which avoids the indicated disadvantages, in particular, combining high energy density and high specific output while retaining long lifetime and low material cost. Further, the solid-electrolyte battery is to be simple in construction and therefore easy to make, as well as reliable enough for all fields of application.

The solution of the problem consists, in accordance with the invention, of making the solid-electrolyte battery in the form of a multiplicity of parallel-connected, tubular anode and cathode spaces bounded by the solid electrolyte and alternatingly arranged in close proximity to one another so that each electrode space presents reaction surfaces simultaneously to at least two neighboring electrode spaces of the opposite polarity.

By splitting up the anode and cathode space into a multiplicity of parallel-connected electrode spaces, their reaction areas are considerably increased. Since here the electrode spaces are completely surrounded by solid electrolyte, no problems about additional materials arise. Each of the electrode spaces has at least two neighboring electrode spaces of opposite polarity to its own, and the specific output is therefore additionally increased. The electrode spaces are packed close together and their inner cross section is made as small as possible compared with their surface, but not so small as to interfere with the supply of reactants or removal of reaction products or with current input or output. A cross-sectional area of the electrode spaces of preferably 10 mm$^2$ and a length of these spaces of about 100 mm should not be exceeded in sodium-sulfur batteries, for example. Since all electrode spaces are surrounded by solid electrolyte, no special external sealing of the battery is usually necessary.

The solid electrolytes of the application can consist of any materials and according to the type and/or conditions of use of the battery can be formed as ceramic, organic or semi-solid electrolytes. Here semi-solid electrolytes are understood to be solid or liquid electrolytes that are taken up by a porous carrier.

The main advantage of the solid-electrolyte battery configuration of the invention is that the reaction area is increased, thereby reducing the current loading of this area. The reaction area is increased here preferably by a factor of 3 to 10, but larger values can also be attained. The current loading of the reaction area is thus reduced by the same factor. If the original value for the current loading is used, then the specific output of the battery is increased by the corresponding factor. This is particularly significant if high outputs, for example, over a short period of time, are to be obtained from relatively small batteries.

All or nearly all single electrolyte solid-electrolyte batteries can be made in the manner of the invention. This form is especially advantageous, however, for batteries based on alkali metal and sulfur which are intended for mobile use, e.g. in electric-drive vehicles. Here the advantages obtainable with the configuration of the invention become especially important.

The solid-electrolyte battery can be made up from individual anode and cathode spaces, but it is particularly advantageous to make the solid electrolyte in the form of a block and bore out the electrode spaces in it.

A neat arrangement is obtained here if the electrode spaces are parallel, straight holes uniformly distributed over the cross section of the solid-electrolyte battery.

Another preferred feature of the invention is that the electrode spaces in cross section are mostly in the form of a square or equilateral triangle. In this way, the reaction areas are made particularly large with uniform thickness of the intervening electrolyte.

To simplify input and extraction of the reactants and current, it is advantageous if the electrode spaces, for parallel electrical connection and parallel supply with reactants, are each connected to at least one common collecting or equalizing space which has an electrical connection.

For simple construction of the solid-electrolyte battery, it is recommended that the anode spaces be closed at one end of the battery and similarly for the cathode spaces, while their other ends open into the collecting or equalizing spaces, with the closed ends of the anode spaces adjoining the open ends of the cathode spaces. In this way, the open ends of the same type of reaction spaces are all situated on one end of the solid-electrolyte battery.

It proves useful here if the collecting and equalizing spaces are hollowed out in the solid electrolyte and covered with a sealing plate.

To further simplify the input and extraction of the reactants and current, the cover plates have approximately central, sealable feed pipes for the reactants which are in contact with the reactants or electrodes and form the electrical contacts.

If the solid-electrolyte battery has liquid or solid reactants or electrodes, a further advantageous feature is that the electrical contacts can make connection with the reactants or electrodes or reaction surfaces by way of an electrically conducting matrix if necessary.

In order to reduce the internal electrical resistance, it is desirable to embed at least one electrical conductor in the matrix which extends from the vicinity of the electrical terminal into the electrode spaces. The electrical conductor preferably consists of graphite.

Several solid-electrolyte batteries can be connected in series in an advantageous manner if they are joined by their opposite-polarity collecting and equalizing spaces with a common electrically conducting cover plate, separate, sealable tubes being incorporated at least in the common cover plates so that connection can be made from the outside to the corresponding collecting or equalizing spaces.

BRIEF DESCRIPTION OF THE DRAWINGS

Further advantages of the invention appear from the description of examples of the embodiments with the aid of the schematic drawings in which.

DETAILED DESCRIPTION OF THE PREFERRED EMBODIMENTS

The same reference numbers are used for the same parts in the various figures.

Figure 1:
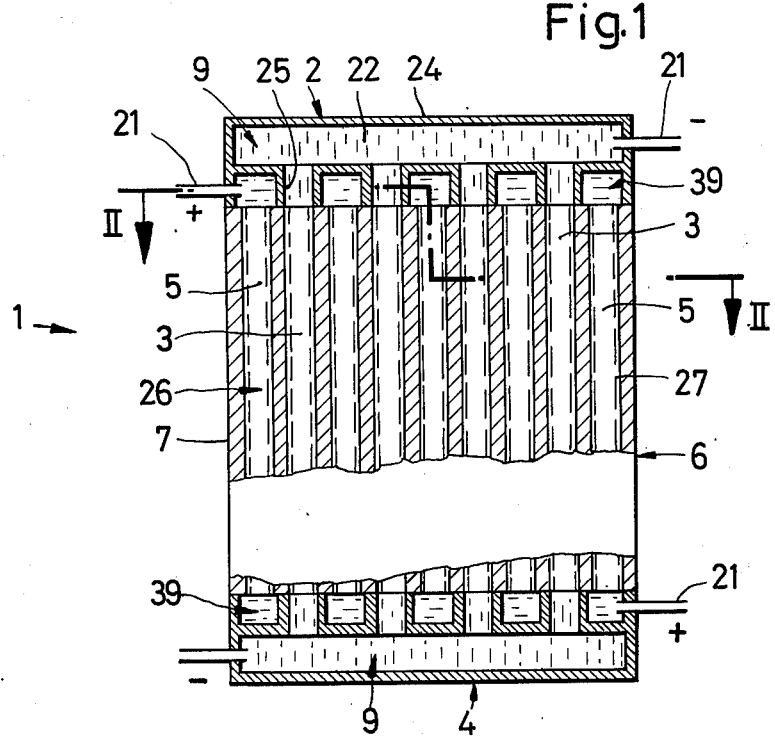
FIG. 1 shows a longitudinal section through a solid-electrolyte battery for the generation of electrical energy (fuel cell) along the line I—I of FIG. 2.
Figure 2:
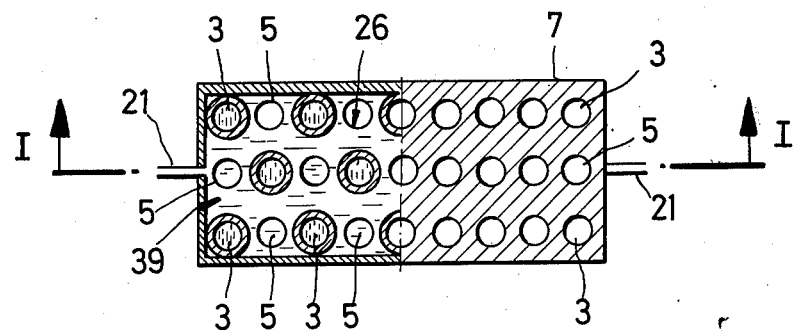
FIG. 2 is a plan section through the battery of FIG. 1 along the line II—II of FIG. 1.

FIGS. 1 and 2 show a solid-electrolyte battery in the form of a fuel cell. It consists of the block-shaped solid electrolyte 7 in which the anode 3 and cathode spaces 5 are circular cylinders. The electrode spaces 3, 5 are uniformly distributed over the solid electrolyte and as close together as possible, so that each of the electrode spaces presents large reaction areas 26 to as many adjacent electrode spaces of the opposite polarity as possible. The electrodes spaces 3, 5 penetrate the solid electrolyte and at their unblocked ends open into collection spaces 9, 39 provided at the ends of the solid-electrolyte block 7. Since fuel cells usually operate with poor electrically conducting gases, their reaction surfaces are provided with electrodes 27 for collecting the current. The electrodes here usually consist of porous silver or nickel. The collecting spaces 9, 39 are hollowed out in a plate 24 of solid electrolyte which is hermetically sealed to the solid electrolyte 7 with glass or ceramic solder, for example. The open ends of the cathode spaces 5 open directly into the corresponding collecting space 39, while the open ends of the anode spaces 3 communicate through spacer holes 25 with the corresponding collecting space 9 which is situated above and beneath the other collecting space 39. Feed or discharge tubes 21 open into the collecting spaces 9, 39 for the supply of reactants and the removal of reaction products. The feed tubes 21 serve at the same time for carrying the current out of the fuel cell.

In order to connect the feed tubes 21 electrically with the porous electrodes 27 at the reaction surfaces of the electrode spaces, porous matrices 22, e.g. of graphite or metal, are provided in the collecting spaces and extend from the vicinity of the feed tubes 21 to the electrodes 27. The electrodes 27, of course, could just as well be connected with the feed tubes 21 by metal wires.

For the operation of the battery fuel, e.g. hydrogen, is fed into the anode spaces 3 and oxidant, e.g. air, into the cathode spaces 5 through the feed tubes 21. The resulting electric current is conducted away by the electrodes 27 and the feed tubes 21, while the reaction products are carried off at the bottom of the battery. The reactions occurring in a fuel cell are generally known, so that further discussion of them is unnecessary. In the present example the solid electrolyte is zirconium dioxide.

Figure 3:
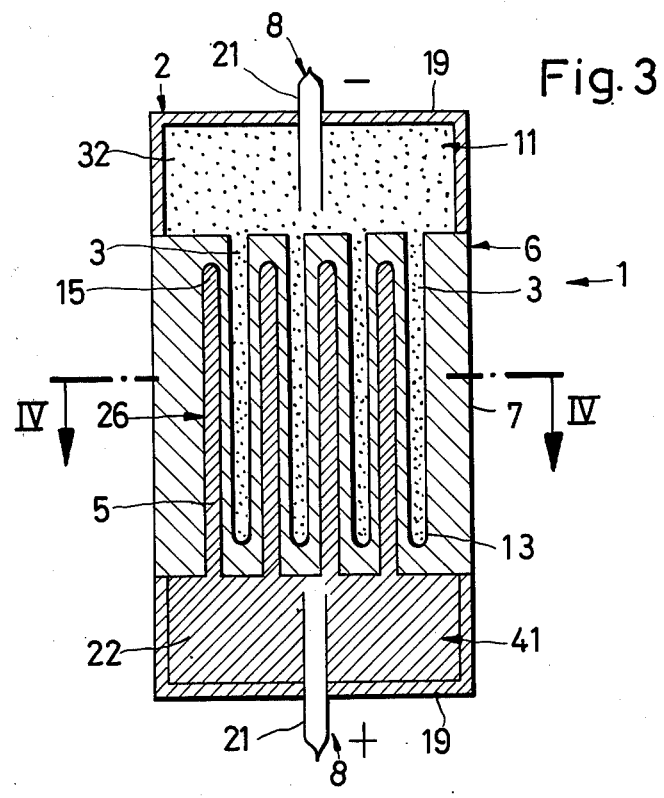
FIG. 3 shows a central, vertical section through an electrochemical storage battery with alkali metal and sulfur as reactants (sodium-sulfur battery) with a cylindrical outer shape, the electrode spaces in the form of holes being closed at one end and having equalizing spaces for the reactants at their opposite, open ends.
Figure 4:
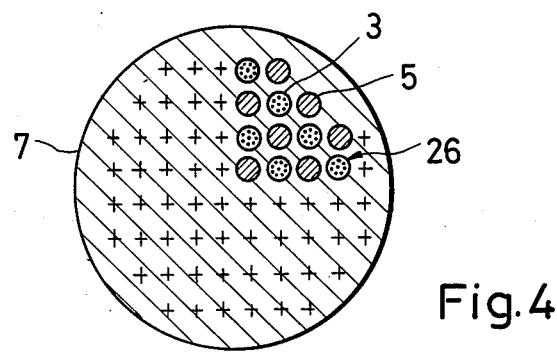
FIG. 4 is a plan section through the battery of FIG. 3 along the line IV—IV, not all electrode spaces being shown.

In the example of the embodiment of FIGS. 3 and 4, where a sodium-sulfur battery is shown, the anode spaces 3 and cathode spaces 5 are made as straight, cylindrical holes in the cylinder-shaped solid electrolyte 7. As is particularly apparent from FIG. 4, these electrode spaces 3, 5, alternating in polarity from one to the next, are distributed uniformly and close together in great number over the solid electrolyte. The electrode spaces run parallel to one another and to the long axis of the cylindrical solid electrolyte 7. The cathode spaces 5 and anode spaces 3, here, are closed at one end 15, 13, while the open ends of the electrode spaces of the same type are on the same side, i.e. the anode spaces open on one side and the cathode spaces on the opposite side. The electrode spaces 3, 5 open into the equalizing spaces 11, 41. These equalizing spaces are each formed with a cup-like cover 19 sealed at its rim to the solid electrolyte. A glass or ceramic powder is used as the sealant. The outer diameters of the solid electrolyte 7 and the cover 19 are equal. The material for the cover can be aluminum, stainless steel or ceramic, e.g. α-aluminum oxide ($Al_2O_3$), while the solid electrolyte consists of β-aluminum oxide ($\beta$-$Al_2O_3$).

Instead of hollowing out the electrode spaces in the solid electrolyte, it is also possible to assemble the battery from separate anode and cathode spaces. Here the electrode spaces are each surrounded by solid electrolyte and formed as separate parts which fit together with large contact surfaces.

The electrical terminals 8 are mounted in the centers of the covers 19. They each consist of a feed pipe 21 leading from outside into the equalizing space 11, 41. This tube can be of aluminum or stainless steel, but, for reasons of cost, aluminum is preferred just as for the cover 19.

The cathode spaces 5 as well as the associated equalizing space 41 are filled with a porous matrix 22, e.g. of graphitized felt. With this matrix, the input or output current is conducted from the electrical terminal 8 to the reaction surfaces 26, since the reactant in the cathode space 5, e.g. sulfur, is a poor electrical conductor. In general this is not necessary for the anode spaces 3 and the associated equalizing space 11, since the sodium filling them is a good electrical conductor. If this were not the case, the anode space would also have to be filled with a suitable matrix 32, such as metal wool.

The reactants are introduced by way of the feed tubes 21. Sodium is fed into the anode spaces 3 and the associated equalizing space 11, while sulfur or sodium polysulfide is fed into the cathode spaces 5 and the associated equalizing space 41. This is best done by distillation in vacuum. After the reactants have been introduced, the feed tubes 21 are closed off, e.g. by pinching off their outer ends. For normal operation of this battery, a temperature of about 300° C is required. For charging, the two electrical terminals 8 are connected with proper polarity to a d.c. supply. The reaction taking place in the battery is:

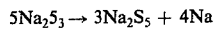

When the battery is charged, a load can be connected to the electrical terminals and current drawn. The following is the reaction taking place:

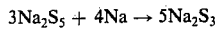

Since sodium is used up during the discharge process, the sodium level drops in the equalizing space 11. Care must be taken, therefore, that the corresponding electrical terminal always remains in contact with the sodium, i.e. it must extend far enough into the equalizing space 11, since, otherwise, the discharge process would be interrupted. During the discharge process the proportion of sulfur in the cathode spaces 5 and the associated equalizing space 41 increases. It is necessary, therefore, to match the quantities of reactants introduced to one another. The transport of the sulfur from the equalizing space 11 to the reaction surfaces of the cathode spaces 5 is by capillary action of the cathode spaces and the porous matrix 22, e.g. graphitized felt, therein. In this way, the battery is also to be operated in the position shown by FIG. 3, which is purely accidental. If, on the other hand, the battery is to be operable in any position, there must likewise be a porous matrix 32 in the equalizing space 11 for the sodium as well as in the anode spaces 3 for the transport of the sodium. This matrix can consist of metal wool for example. By making the equalizing spaces 11, 41 large, a large quantity of reactants can be stored and thus the operating time arbitrarily increased.

Figure 5:
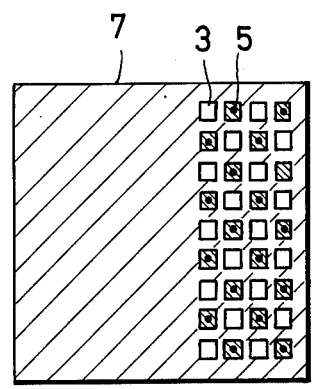
FIG. 5 shows a cross section through a variant of the battery of FIG. 3, analogous to FIG. 4.
Figure 6:
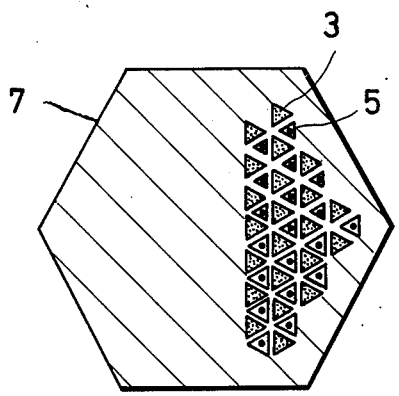
FIG. 6 is a cross section through another variant of the battery of FIG. 3, analogous to FIG. 4.

While the electrode spaces 3, 5 according to the configuration of FIGS. 3 and 4 are cylindrical in shape, FIGS. 5 and 6 show very favorable shapes for these electrode spaces as well as the entire cell. In FIG. 5 the battery 1 is square in cross section and the electrode spaces 3, 5 also have square cross sections. This design results in very good space utilization and guarantees each electrode space the largest possible reaction area with uniform thickness of the intervening electrolyte.

In the configuration of FIG. 6 the electrode spaces 3, 5 have a cross section in the shape of an equilateral triangle. This form also results in very good utilization of the electrolyte. The outer form of the solid-electrolyte battery is in the shape of a hexagon, just as in the case of the square cross section, and allows packing the batteries together without waste of space.

Figure 7:
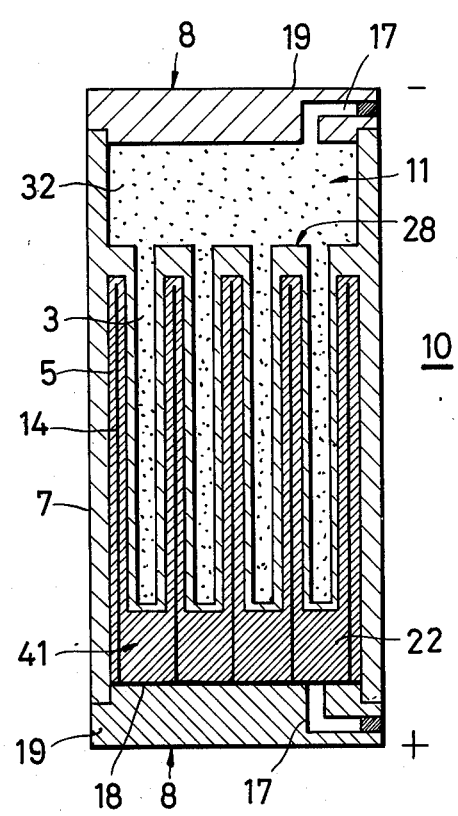
FIG. 7 is a vertical section analogous to FIG. 3 through another configuration of the battery of FIG. 3, FIG. 8 likewise is a vertical section through the battery of FIG. 3 in another variant form.

FIG. 7 shows a preferred variant configuration of the sodium-sulfur battery. Its construction corresponds in principle to that shown in FIGS. 3 and 4. It differs by having the equalizing spaces 11, 41 hollowed out in the electrolyte 7. This hollowed-out portion is in the form of a short conduit, one end 28 of which receives the openings of all the electrode spaces and the other open end of which is sealed with a cover 19, here in the form of a plate with a centering shoulder.

This plate is preferably of aluminum and has in places which could be attacked by the reactants, on the sulfur side for example, a coating 18 of graphite. This coating is resistant to the reactants and, in addition, exhibits good electrical conductivity. This is especially important here, since the plate in this case is also used as the electrical terminal 8. For this, it is in contact on the cathode side with the introduced matrix 22. In order to produce contact between the sodium and the aluminum plate on the anode side, a matrix 32, of metal wool for example, is likewise provided in the equalizing space 11. If this matrix is also extended into the anode spaces 3, the battery is made operable in any position, since sodium transport is ensured by the capillary action of the matrix. Because the sodium in equalizing space 11 does not react with the aluminum plate, a protective coating is not required.

Since the matrix 22 of graphite-felt on the cathode side is not an especially good electrical conductor, electrical conductors 14, preferably in the form of graphite rods, are embedded in the matrix, extending from the vicinity of the associated terminal 8 to the ends 15 of the cathode spaces. In this manner, the internal resistance of the battery is greatly reduced.

In order to facilitate filling the battery with reactants, each cover plate 19 is made with a hole 17 through it by which each of the equalizing spaces 11, 41 communicates with the outside 10 and which is closed off, e.g. with a plug, after the battery is filled.

Figure 8:
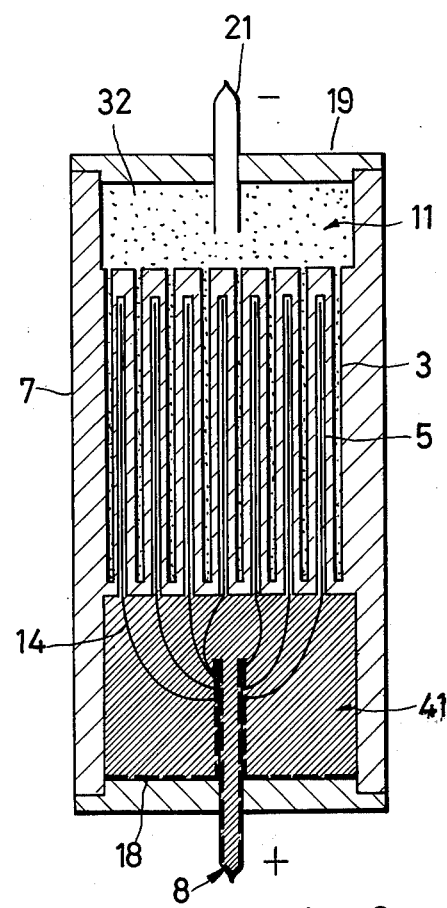

In the configuration of FIG. 8, the equalizing spaces 11 again are hollowed out of the solid electrolyte. The equalizing space 41 for the cathode spaces 5 is larger in volume than the corresponding equalizing space 11 on the anode side, since the sulfur or the sodium polysulfide produced in discharging the battery is greater in volume than the sodium. The sealing plates 19 here are simple covers and are provided with feed tubes 21, as shown in FIG. 3 and already described, which also constitute the electrical terminals. These feed tubes, like the covers, are of aluminum and are provided, on the cathode side, with a graphite coating at places contacting the sulfur or sodium polysulfide. The electrical conductors 14, embedded in the matrix 22 on the cathode side 5 of the battery in this case, are in the form of aluminum wires which are connected to the feed tube 21 and penetrate into the cathode spaces 5. These wires are likewise coated with a layer of graphite. Compared with the configuration of FIG. 7, there is still better conduction of current to and away from the reaction surfaces here.

Figure 9:
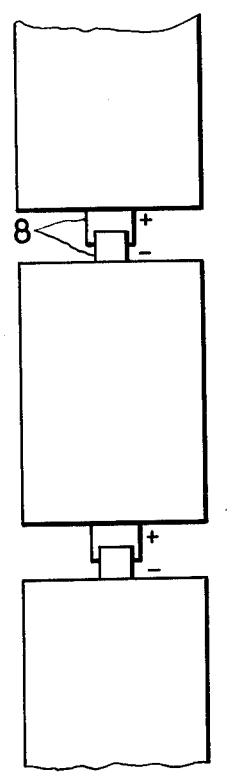
FIG. 9, 10 and 11 show sodium-sulfur batteries connected together in different ways.
Figure 10:
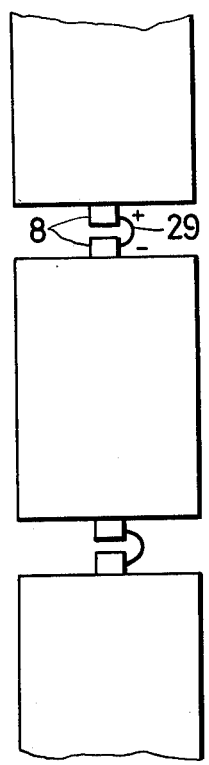
Figure 11:
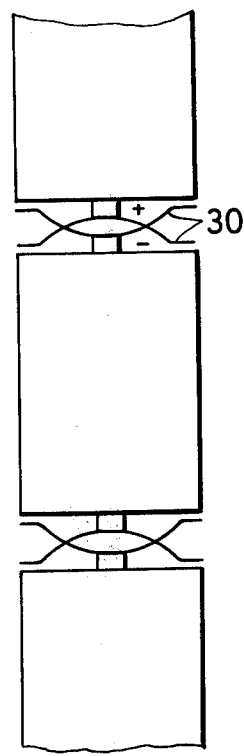

FIGS. 9 to 11 indicate methods for connecting the solid-electrolyte batteries together. In FIG. 9, the electrical terminals 8 of different polarities are pressed together in the manner of flashlight batteries.

FIG. 10 shows the connection of the electrical terminals by means of a wire loop 29, while, in FIG. 11, bowed pieces of metal 30 make the electrical connection.

Figure 12:
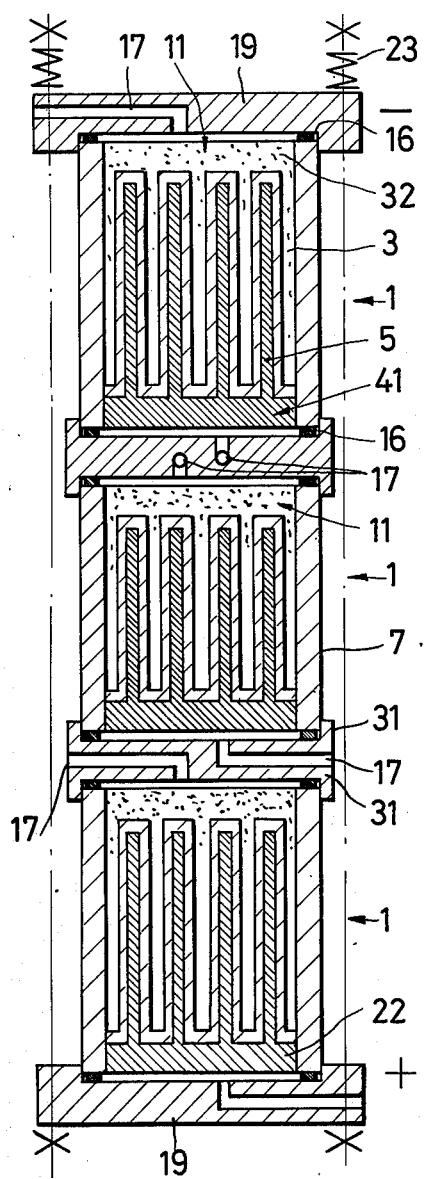
FIG. 12 is a vertical section through series-connected sodium-sulfur batteries.

FIG. 12 shows a particularly good series of solid-electrolyte batteries (sodium-sulfur batteries) sealed with plate-type covers and stacked on top of one another to make a series connection. The construction of the individual batteries here is similar, even with regard to the cover 19, to that shown in FIG. 7 and described above. The covers of adjacent batteries experience a transformation here, however, in that they they serve simultaneously to seal two batteries. For this, the common covers 31 are provided with overhangs on both sides which grip the ends of the batteries for centering. At the points of contact between the batteries and the cover plates 19, 31, there are inserted gaskets 16 in the form of aluminum rings. For filling the batteries with reactants, the common cover 31 has two separate holes 17 which, as previously explained, are closed off after the filling process.

After stacking of the batteries with insertion of the common covers 31 and sealing gaskets 16, they are provided with sealing covers 19 at their ends with only one filling hole. In order to hold the stack of batteries together, a compression arrangement 23, consisting of clamping bolts and springs for example, acts on the covers 19. The main advantage of this construction is that the assembled batteries can readily be filled with the reactants since the filling holes open to the outside through the rims of the covers.

Figure 13:
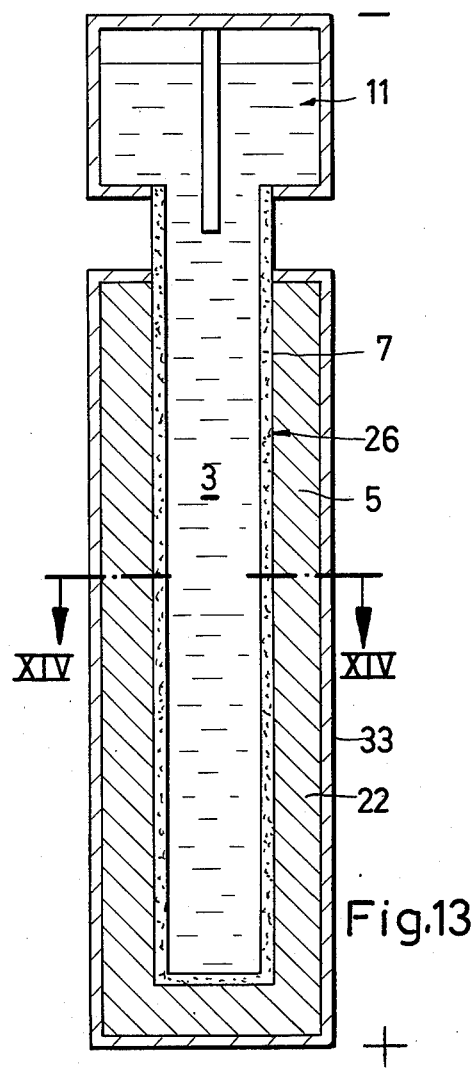
FIG. 13 shows a vertical section through a conventional storage cell and FIG. 14 is a cross section through the battery of FIG. 13 along the line XIV—XIV.
Figure 14:
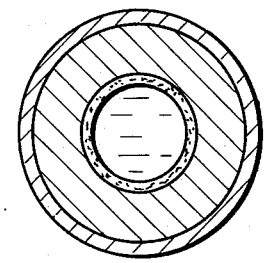

Opposite FIG. 12 is FIG. 13 with a cross section as shown in FIG. 14. The sodium-sulfur battery of FIGS. 13 and 14 is constructed according to the state of the art. Thus, for example, the tubular solid electrolyte 7, closed at the bottom and enclosing the anode space, is surrounded by a likewise cylindrical cathode space 5. It is enclosed by an outer sleeve 33 of stainless steel which serves also as an electrical contact. The current here also is, on the cathode side, conducted by a matrix 22 to the reaction surface 26 of the solid electrolyte 7. Situated at the upper end of the battery is the equalizing space 11 made in the form of a stainless steel cup and sealed from the outside.

By comparing FIGS. 12 and 13, the advantages in the construction of the battery of the invention in FIG. 12 are easily recognized.

These advantages become still more apparent when the following is considered. As can easily be seen in FIGS. 12 and 13, the battery of the invention has the same dimensions and the same capacity as the conventional battery. The numerical characteristics of these two batteries are compared in the following table:

|  | Battery of FIG. 12 | | Battery of FIG. 13 | |
| --- | --- | --- | --- | --- |
| Overall length | 17 cm | | 17 cm | |
| Outer diameter | 4 cm | | 4 cm | |
| Total volume | 213.5 cm³ | | 213.5 cm³ | |
| Effective cell length | 12 cm | | 12 cm | |
| Active cell surface | with 2 mm capillary - Φ and 1mm electrolyte strength 438 cm² | | with 2mm capillary - Φ and 2mm electrolyte strength 57 cm² | |
| Quantity of Na stored | capillaries 23 cm³ reservoir 24 cm³ | | cell 23 cm³ reservoir 24 cm³ | |
| Total weight | 530g | | 520g | |
| Electrical data: | | | | |
| Open-circuit voltage | 3×U_z = 3×2.1 = 6.3V | | 2.1V | |
| Total stored energy | 56 Ah × U_z | | 56 Ah × U_z | |
| Usable electrical energy | 80–100 Wh | | 80–90 Wh | |
| Energy density | 150–188 Wh/Kg | | 153–172 Wh/Kg | |
| Weight/energy ratio | 6.67–5.32 Kg/KWh | | 6.54–5.81 Kg/KWh | |
| Output: | | | | |
| at current densities of 25 and 200 mA/cm² | 25 mA/cm² | 200mA/cm² | 25 mA/cm² | 200 mA/cm² |
| Cell output (W) | 22 | 150 | 2.9 | 19.2 |
| Specific output (W/Kg) | 41.5 | 283 | 5.5 | 37 |
| Weight/output ratio (Kg/kW) | 24 | 3.53 | 182 | 26.8 |
| Volume/output ratio (W/l) | 103 | 703 | 13.4 | 90.9 |
| (l/kW) | 9.7 | 1.42 | 74.7 | 11 |

As appears from the table, the two batteries are substantially identical or similar in their construction and weight as well as in their dimensional characteristics, so that they are directly comparable with one another.

Considering the last lines of this table, it is found that the battery of the invention puts out more than the conventional battery, many times over. Correspondingly, favorable therefore are also the values for the specific output, the weight/output ratio and the volume/output ratio.

Herewith there is the advantage of being able selectively to raise the specific output or reduce the current loading of the reaction surfaces at constant specific output. This increases the lifetime of the solid-electrolyte battery.

Moreover it is possible to operate the battery at lower temperatures without having to accept a loss in specific output at the same time. The large reaction areas compensate the loss in output. Low operating temperatures extend the battery lifetime, reduce the risk of corrosion and thus allow the use of low-cost material that often is not very resistant to corrosion.

A further advantage of the low operating temperatures is that in sodium-sulfur batteries, instead of the sulfur and sodium polysulfides, solutions of these substances in organic solvents can be used at an operating temperature between room temperature and about 200° C. The large reaction areas compensate here too for the temperature-dependent output drop of the battery.

The advantages mentioned accrue quite generally to solid-electrolyte batteries conforming to the invention.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Solid-electrolyte battery for the storage of electric power with a large number of anode and cathode spaces forming electrode spaces arranged parallelly in straight channels attached to collecting spaces and alternately disposed in an ion conducting body of solid electrolyte so that the electrode spaces have adjacent electrode spaces of opposite polarity wherein the anode spaces comprise a first set of hollow recesses in the body of the solid electrolyte forming anode channels closed at one end and open at the other end to a first collecting space disposed in the body of the solid electrolyte and the cathode spaces comprise a second set of hollow recesses in the body of the solid electrolyte forming cathode channels closed at one end and open at the other end to a second collecting space disposed in the body of the solid electrolyte, the first and second collecting spaces having a locking lid.

2. Solid-electrolyte battery according to claim 1 wherein the locking lid comprises a centrally located locking inlet pipe and forms an electric contact.

3. Solid-electrolyte battery according to claim 2 wherein the locking lid is metallic.

4. Solid-electrolyte battery according to claim 3 wherein the locking lid has a layer of graphite in places exposed to corrosion.

5. Solid-electrolyte battery according to claim 2 wherein the locking lid includes side walls and channel systems which lead from the first and second collecting spaces into the side walls.

6. Solid-electrolyte battery according to claim 1 further comprising porous matrix electrodes and wires disposed in the first collecting space and connected to the anode electrodes.

7. Solid-electrolyte batteries as in claim 1 electrically connected in series with an intermediary locking lid.

8. Solid-electrolyte battery according to claim 7 further comprising a sealing gasket disposed between the locking lid and the body of the solid electrolyte and being secured therebetween by a compression arrangement.

* * * * *